Patented Dec. 18, 1923.

1,477,805

UNITED STATES PATENT OFFICE.

CLAYTON W. BEDFORD, OF AKRON, OHIO, ASSIGNOR TO GOODYEAR TIRE & RUBBER COMPANY, OF AKRON, OHIO, A CORPORATION OF OHIO.

ACCELERATOR FOR THE VULCANIZATION OF CAOUTCHOUC SUBSTANCES.

No Drawing. Original application filed January 6, 1917, Serial No. 140,888. Divided and this application filed November 24, 1919. Serial No. 340,261.

*To all whom it may concern:*

Be it known that I, CLAYTON W. BEDFORD, a citizen of the United States, residing at Akron, in the county of Summit and State of Ohio, have invented new and useful Accelerators for the Vulcanization of Caoutchouc Substances, of which the following is a specification.

The present invention relates to the art of vulcanizing or curing caoutchouc substances and more particularly to accelerators for use therein, and will be fully understood from the following specification:

From the present knowledge of the art of curing rubber, either synthetic or natural, it appears that the presence of nitrogen containing bodies during vulcanization is essential to the formation of a practical or commercial product. Suitable nitrogen containing bodies may be found in natural rubber, as obtained from latex, or may be added during the process of manufacture. The absence of nitrogen, however, results in a vulcanized product having substantially no commercial value for many purposes. It has hence been the practice to add to the rubber mix, before vulcanization, certain nitrogen containing bodies which improve the properties of the product and shorten the time required to cure it.

These nitrogen bodies have been known to the trade by the name of "accelerators". A large number of publications may be found disclosing the utility and properties of certain specific nitrogen bodies and of certain classes or types of nitrogen bodies as accelerators, these types or classes having been classified according to their chemical constitution and reactions or by certain physical properties such as their dissociation constants, etc. All of these bodies will be hereinafter included in the general term "nitrogen accelerators".

As set forth in my prior Patent No. 1,371,662, granted March 15, 1921, of which this application is a division, I have found that the nitrogen accelerators now known to the art are not usually the ultimate bodies which assist in the vulcanization of caoutchouc, but that these nitrogen accelerators must first re-act with sulphur and that the sulphur re-action product thus formed is the agent which either aids or is entirely responsible for the satisfactory vulcanization of the rubber with sulphur.

In the procedure heretofore utilized there are certain marked disadvantages. For example, the temperatures used in vulcanizing caoutchouc are only occasionally and by the merest coincidence the temperatures most suitable for a reaction between sulphur and the nitrogen accelerator present. Thus, it is frequently the case that the proper temperature for vulcanization is not sufficiently high to bring about a satisfactory reaction between the nitrogen accelerator and the sulphur, which results in that a substance which is in reality a good accelerator appears to be wholly inactive, or does not exert its full curing power. For example, carbanilide is almost inactive at the usual vulcanization temperature corresponding to 40 pounds of steam pressure, whereas at 60 to 80 pounds pressure it shows very valuable qualities.

In other cases nitrogen accelerators which possess, in fact, valuable properties, are regarded as commercially impractical by reason of the fact that large volumes of gas are produced during their reaction in the vulcanization process, the resulting product being correspondingly porous and defective. Since the gases produced during this reaction frequently contain $H_2S$ and other malodorous compounds, the product obtained is frequently very foul smelling. This is the case, for example, with such compounds as hexamethylenetetramine and urea, in the use of both of which large volumes of gas are liberated during the vulcanization process as a result of the reaction of these bodies with sulphur.

In accordance with the present invention, the disadvantages above described have been avoided, the use of nitrogen accelerators in vulcanization facilitated and the results of their use greatly improved by first causing a reaction of the nitrogen accelerator with sulphur in suitable proportions prior to incorporation into the mix to be vulcanized. It is then possible to carry out the reaction between the nitrogen accelerator and the sulphur at the temperature best suited thereto, and to remove any undesired gaseous or other by-products which are formed as a result of the reaction with the nitrogen accelerator. It is therefore possible, by the present process, to employ many nitrogen accelerators which at present are regarded as impractical or of no commercial value and to secure more advantageous results with many accelerators now in use.

The first stage of my process wherein the nitrogen accelerator is acted upon by sulphur prior to introduction into the other mix, may result in a substitution of sulphur in the nitrogen accelerator, indicated by the liberation of hydrogen sulphide and other volatile sulphur compounds, although sulphur addition and polymerization may, and probably do, occur.

The proportions of a sulphur reaction product of a nitrogen accelerator, which will hereinafter be designated as a sulphur-nitrogen accelerator, which are incorporated into the rubber mix, may be varied. Thus, in a mixture containing one part of sulphur, sixteen parts of zinc oxide and sixteen parts of pale-crêpe plantation rubber, from one-half part to two parts of the sulphur nitrogen accelerator may be used. Such a mixture may be vulcanized by heating under from forty to fifty pounds of steam pressure for from twenty to fifty minutes, the time required for curing the rubber being greatly diminished by the addition of a sulphur nitrogen accelerator. The resulting vulcanized product is of higher quality than a like mix, which is vulcanized without the accelerator, as evidenced by its higher tensile strength, higher modulas of elasticity and etc. Furthermore, by shortening the time of cure, the output of a given equipment is increased.

My preferred method for producing a sulphur-nitrogen accelerator from thiocarbanilide, for example, is as follows, the following ingredients being used:

910 parts thiocarbanilide.
514 parts sulphur.
744 parts aniline.

The mixture is brought to a boil under an efficient reflux condenser, and the temperature of the liquid gradually raised to 190° C. This temperature is held until 133 parts (by weight) of gas have passed through the condenser. The liquid is now distilled quickly with as little refluxing as is possible until 787 parts of aniline have been removed. If, at this point, the total gas loss has not reached 190 to 200 parts, a reflux condenser is again applied to the still and distillation with refluxing continued until the gas loss reaches the figure given. The temperature at the end of the distillation of the aniline or at the end of the final refluxing process when the latter is used should reach but not exceed 270° C. The reaction is now complete and the reaction product suitable for use in the rubber mix.

In the reaction above described it is obvious that, in accordance with the known laws of chemical action, the reaction product of thiocarbanilide and aniline, namely, triphenyl-guanidine, will be produced, at least initially. This product will necessarily react in its turn with the sulphur present in the mixture, producing a sulphur-nitrogen accelerator, which will form a substantial portion of the final product of the reaction.

As a further example of the process the following may be mentioned: 108 parts paraphenylenediamine are mixed with 32 parts of sulphur. The mixture is melted together, being constantly stirred, and brought to a temperature of 180° to 200° C., care being exercised to prevent local over-heating. After the vigorous reaction has subsided and the evolution of gas has dropped to a minimum, the reaction product is cooled, ground and sifted. This material which is an organic compound, containing both sulphur and nitrogen, shows many advantageous properties as an accelerator over the original nitrogen body.

According to my invention, therefore, an entirely new class of nitrogen compounds is made use of for the purpose of bringing about the vulcanization of caoutchouc, these compounds being the reaction products of sulphur with nitrogen accelerators, such reaction products being obtained independently of the vulcanization process both as regards time and place, temperature, proportions of ingredients or reactive substances, and all other conditions. This new class of accelerators I identify by the term "sulphur-nitrogen accelerators", that is, reaction products of elemental sulphur and nitrogen-containing bodies of the class or classes known as accelerators. By the term "nitrogen accelerators" as employed herein, I wish it to be understood, however, that I intend to define all of those nitrogen containing bodies, the properties of which are such that they tend to enter into reaction with sulphur in a rubber mix as the result of which vulcanization of the mix is effected or expedited. As I have pointed out, many substances are inherently accelerators within this broad sense, which would not be so regarded in the present state of the art, for the reason that their accelerating effect could not be obtained under the temperature and other limitations of the vulcanizing process per se. It is a fact that certain hitherto known accelerators, such as thiocarbanilide, include sulphur in their compositions. I do not intend to include such accelerators within the term "sulphur nitrogen accelerators." I do, however, include within this term the products formed by causing elemental sulphur to react with thiocarbanilide or the like, such reaction product being distinctly different both chemically and physically from the original accelerator.

In addition to the amino bodies, secondary amines and imines, such as the specific nitrogen accelerators heretofore mentioned, I find that nitroso bodies, such as para-nitrosodimethylaniline, cyanide bodies, such as sodium ferrocyanide, and proteids and the products of their decomposition and hydrolysis, including the amido acids, and such, for instance, as animal glue or gelatine, give advantageous results when employed according to my process. It will be evident that in preparing the sulphur-nitrogen accelerator of my invention, it is not necessary to limit the amount of sulphur to that required for reaction with the nitrogen-accelerator. Although this is in some respects advantageous, it is permissible to admix the entire amount of sulphur to be used for vulcanization with the nitrogen accelerator.

While I have described in considerable detail the theories which underlie my present invention and have given certain specific examples of procedure and materials to be employed, it will be understood that I do not regard the invention as dependent upon the soundness or accuracy of such theories, nor as limited to the specific procedure or materials mentioned, except in so far as such limitations are included within the terms of the accompanying claims, in which it is my intention to claim all novelty inherent in my invention as broadly as is permissible in view of the prior art.

What I claim as new and desire to secure by Letters Patent is:

1. The non-gaseous reaction product of a nitrogen accelerator and sulphur.
2. The sulphur addition product of a nitrogen accelerator.
3. The non-gaseous reaction product of a nitrogen accelerator and sulphur, said product being freed from inert and deleterious materials.
4. The process of producing a sulphur nitrogen accelerator which consists in bringing together under reacting conditions sulphur and a nitrogen accelerator in the presence of an amine.
5. The process of producing a sulphur nitrogen accelerator which consists in bringing together sulphur and a nitrogen accelerator in the presence of aniline.
6. The process of producing a sulphur nitrogen accelerator which consists in bringing together thiocarbanilide and sulphur under reacting conditions.
7. The process of producing a sulphur nitrogen accelerator which consists in bringing together under reacting conditions in the presence of an aromatic amine, thiocarbanilide and sulphur.
8. The process of producing a sulphur nitrogen accelerator which consists in bringing together thiocarbanilide, sulphur, and aniline, heating the mixture to produce reaction therebetween, and removing the excess of aniline.
9. The sulphur nitrogen accelerator comprising the reaction product of sulphur upon thiocarbanilide in the presence of aniline.

CLAYTON W. BEDFORD.